United States Patent [19]
Gimson et al.

[11] Patent Number: 5,339,687
[45] Date of Patent: Aug. 23, 1994

[54] FLOWMETER

[75] Inventors: Christopher Gimson, Westhoughton; Mehran Pasdari, Sale, both of United Kingdom

[73] Assignee: Endress & Hauser Limited, United Kingdom

[21] Appl. No.: 752,442
[22] PCT Filed: Feb. 16, 1990
[86] PCT No.: PCT/GB90/00264
§ 371 Date: Sep. 20, 1991
§ 102(e) Date: Sep. 20, 1991
[87] PCT Pub. No.: WO90/09567
PCT Pub. Date: Aug. 23, 1990

[30] Foreign Application Priority Data

Feb. 18, 1989 [GB] United Kingdom ............ 8903744

[51] Int. Cl.$^5$ ............................................. G01F 1/00
[52] U.S. Cl. ................................. 73/204.19; 73/204.27
[58] Field of Search .............. 73/204.14, 204.15, 195, 73/204.25, 204.16, 204.19, 204.21

[56] References Cited

U.S. PATENT DOCUMENTS

| | | | |
|---|---|---|---|
| 1,254,374 | 1/1918 | Thomas | 73/284.25 |
| 1,769,358 | 7/1930 | Pinkerton et al. | 73/204.18 |
| 3,056,295 | 10/1962 | Laub | 73/204.16 |
| 4,691,566 | 9/1987 | Aine | 73/204 |
| 4,733,559 | 3/1988 | Aine et al. | 73/204.19 |
| 4,753,111 | 6/1988 | Carou et al. | 73/204.14 |
| 4,872,339 | 10/1989 | Gerhard et al. | 73/204.14 |

FOREIGN PATENT DOCUMENTS

3309404  9/1984  Fed. Rep. of Germany.
3802422  8/1989  Fed. Rep. of Germany.

Primary Examiner—Richard Chilcot, Jr.
Assistant Examiner—R. Biegel
Attorney, Agent, or Firm—Barnes & Thornburg

[57] ABSTRACT

A flow meter includes a body located in thermal contact with a fluid, the flow rate of which is to be measured, a heater in thermal contact with the body, a first temperature sensor for measuring the temperature of the body, and a second temperature sensor for measuring the temperature of the fluid. The flow meter also includes mechanisms for calculating the differential temperature between the fluid and the body, for supplying power to the heater, for measuring the rate at which power is supplied to the heater, for setting a predetermined target differential temperature, and predetermined maximum and minimum differential temperatures, and for comparing the calculated differential temperature with the predetermined target, maximum and minimum differential temperatures. The flow meter further includes mechanisms for controlling the rate that power is supplied to the heater and for calculating the flow rate from the measured rate of power supply and the difference between the temperatures of the body and the fluid.

15 Claims, 7 Drawing Sheets

FLOWMETER

The present invention relates to a flowmeter.

There are many well established techniques which are used to measure the flow rate of a fluid in a closed pipe and which rely upon the thermal properties of the fluid. A number of these techniques are described below, the described techniques being used in commercially available equipment. All the available equipment is constructed and optimised in such a way so as to use only one of the established techniques.

The basic equation of heat flow from a cylindrical transducer placed in a fluid cross flow can be expressed in the general form:

$$M = A \cdot (Q/Dt)^{1.66}$$

where:
- $Tt$ = Temperature of the transducer
- $Tf$ = Temperature of the fluid
- $Dt = Tt - Tf$
- $Q$ = Power applied to the heater to maintain temperature difference $Dt$.
- $A$ = Calibration constant
- $M$ = Mass flow rate There are in fact extra terms that have been ignored in the above equation that contain dependencies on other fluid properties such as thermal conductivity. These terms can be significant under certain conditions as indicated below.

In a first known technique for measuring the flow rate of a fluid, a transducer comprising a heating element and a temperature sensor is mounted so as to have direct (inside a fluid carrying pipe) or indirect (via the pipe wall) contact with the fluid flow. The heating element has power applied to it and the resultant transducer temperature is measured by the sensor. The power input is controlled externally such that the temperature of the transducer is maintained at a fixed value. The moving fluid stream will carry heat from the heating element as it moves past the transducer and hence the power supplied to the heating element to maintain a constant temperature will be proportional to the fluid flow. This technique has the following limitation and/or disadvantages:

1. To minimise errors this technique is limited to fluids whose thermal properties do not appreciably change with temperature or composition.
2. Since the fluid temperature $Tf$ is not measured, errors will result if the ambient temperature changes.
3. To reduce the effects of change in ambient temperature, the transducer can be heated to a temperature considerably higher than that of the fluid. Sensitivity then becomes a compromise however as the higher the temperature differential the less sensitive the sensor becomes. This also requires high powers at high flow rate, and so its applications are limited.

This technique does find applications as it provides results that in some circumstances are sufficiently accurate and it is cheap to implement as the transducer construction particularly simple.

In a second known technique using the same transducer type as the first, a constant differential temperature maintained between the sensor and the fluid. This is possibly the most commonly used technique, but requires a second temperature measuring sensor to monitor the fluid temperature. An external control circuit is provided to control the power supplied to the heating element to maintain a constant temperature difference. The power supplied is thus a function of the fluid flow rate. This second technique has the following limitations, and/or disadvantages:

1. Extensive electronic compensation is often required to minimise errors caused by changes in the thermal properties of the process fluid with temperature. If high accuracy is to be achieved this demands a thorough knowledge of the fluid type and operating conditions prior to calibration of the device.
2. Calibration can be expensive if high accuracy is required.
3. Accuracy is affected by fluid composition changes, for example specific heat and/or thermal conductivity changes.
4. The algorithm used in the control circuit for maintaining the required temperature difference must be precise and stable and can thus be relatively complex.
5. For high flow rates the power levels required to maintain a sufficient differential temperature can be excessive. For any particular maximum transducer power setting the dynamic range of measurable flow rate varies with the required differential temperature so for a high differential temperature the dynamic range is severely limited.

This second technique is widely used nevertheless as the components are relatively simple to construct, and, when the fluid properties and operating conditions are known, the device can be calibrated very accurately. In addition, the power consumption is relatively small, at small temperature differentials the device is very sensitive to small flow rate changes and/or low flow rates, at high temperature differentials the same device can handle wide flow rate changes (at the expense of sensitivity), and since the fluid temperature is continually monitored the required sensitivity can be maintained.

In a third known technique a combined heating element/temperature sensor transducer is again used. This technique relies upon constant power dissipation. Normally used with a single transducer, a simple control circuit provides a constant power level to the heater element. The temperature of the heating element is then inversely proportional to the flow rate. This technique has the following limitations and/or disadvantages:

1. It is sensitive at low flow rates.
2. The transducer can overheat or burn out at low or zero flow rates.
3. For a fixed accuracy of temperature measurement the accuracy of measurement decreases with increasing flow rate.
4. High power levels are required for a wide dynamic range of flow measurement.

This third known technique is used in some situations, particularly for high flow rates, as its single transducer construction is cheap, and the required control circuitry is simple.

In a fourth known technique, which is in essence an enhancement of the second technique described above, a reference measurement is introduced to help compensate for fluid property changes. This requires two heating elements/temperature sensor transducers. Both transducers are operated in the temperature differential mode but the second transducer is placed in a position where it is exposed to the fluid but not directly exposed to the fluid flow. The power required to maintain the second transducer temperature differential is now a function of the fluid properties only. This enables the values of the power level supplied to the transducers to be mathematically manipulated to remove the dependency on those fluid properties. As a first order correction, if the temperature differentials from the fluid temperature of the two transducers are the same, then the power level values can be simply divided to eliminate thermal conductivity effects. The fluid temperature value can be obtained either by a third temperature sensor mounted in the fluid or by simply occasionally switching one of the transducer heating elements off for a set time to obtain a fluid temperature measurement.

This fourth technique has the following limitations and/or disadvantages:

1. If only two transducers are used there may be a settling time delay when step changes in temperature occur.
2. The construction is relatively expensive.
3. Two heater transducers consume more power, a particularly important feature at high flow rates.

This fourth known technique does however provide accurate compensation for thermal property changes in the fluid medium and provides for relatively simple calibration. It has therefore found some application.

Thus, the known techniques provide a range of capabilities which enable solutions to be found to most flow measurement problems. Unfortunately the techniques must be matched to particular applications so that it is difficult to find a single device which can be used in a wide range of situations.

It is an object of the present invention to provide a flow meter which obviates or mitigates the problem outlined above.

According to the present invention there is provided a flow meter comprising a body which in use is located in thermal contact with a fluid the flow rate of which is to be measured, a heater in thermal contact with the body, a first temperature sensor for measuring the temperature of the body, a second temperature sensor for measuring the temperature of the fluid, means for supplying power to the heater, means for controlling the rate at which power is supplied to the heater to maintain a predetermined selected differential temperature between the body and the fluid, means for measuring the rate at which power is supplied to the heater, and means for calculating the flow rate from the measured rate of power supply, characterized in that the power supply means is operative to maintain the rate of power supply at a predetermined maximum rate in the event that the maximum rate is insufficient to maintain the predetermined selected differential temperature, and the calculating means is operative to calculate the flow rate from the differential temperature when the rate of power supply is the said maximum rate of power supply.

Preferably the power supply means is operative to increase the rate of power supply to the predetermined maximum rate if the differential temperature between the body and the fluid is less than a predetermined minimum differential temperature.

The power supply means may be operative to decrease the rate of power supply to a predetermined minimum rate if the differential temperature between the body and the fluid is greater than a predetermined maximum differential temperature.

The power supply control means comprises means for periodically comparing the differential temperature with the said predetermined selected differential temperature, and for increasing or decreasing the rate of power supply in steps of predetermined magnitude in the event of the differential temperature being less than or greater than the said predetermined selected differential temperature respectively.

Thus the flow meter in accordance with the invention provides a system which adapts itself to maintain good accuracy and sensitivity at all flow rates over a wide dynamic range. This is achieved by effectively switching automatically between two modes of operation in dependence upon the change in flow rate of the fluid. For small variations in flow rates the highly accurate constant differential temperature method is employed, using a high transducer power setting for high flow rates. For sudden large fluctuations in the flow rate the constant power method is employed. By increasing or decreasing the transducer power by a large step the meter temporarily abandons the high accuracy mode and adopts a wider measuring range. Having obtained a current flow rate value the meter reverts to the constant temperature differential mode when conditions permit and slowly increases or decreases the transducer power until the transducer temperature differential is constant again and a more accurate flow rate value can be calculated.

Preferably the or each heater is provided with an electronic drive circuit, for example a programmable pulse width modulated power source providing a train of energising pulses at a fixed or variably frequency. Each temperature measuring sensor is provided with an amplifier. A control circuit is provided which has the capacity to control the power supply to the or each heater and for monitoring the various temperature sensor outputs. Ideally a microprocessor is used with a multiplexed analogue to digital converter.

Preferably two transducers are provided, one of the transducers acting as a fluid property measurement device. Preferably means are provided to detect any step changes in temperature, and a microprocessor is arranged to calculate new fluid properties and apply appropriate compensation. This approach enables a microprocessor to generate its own empirical compensation characteristics that are periodically updated during operation.

An embodiment of the present invention will now be described, by way of example, with reference to the accompanying drawings, in which.

Figures 1, 2:
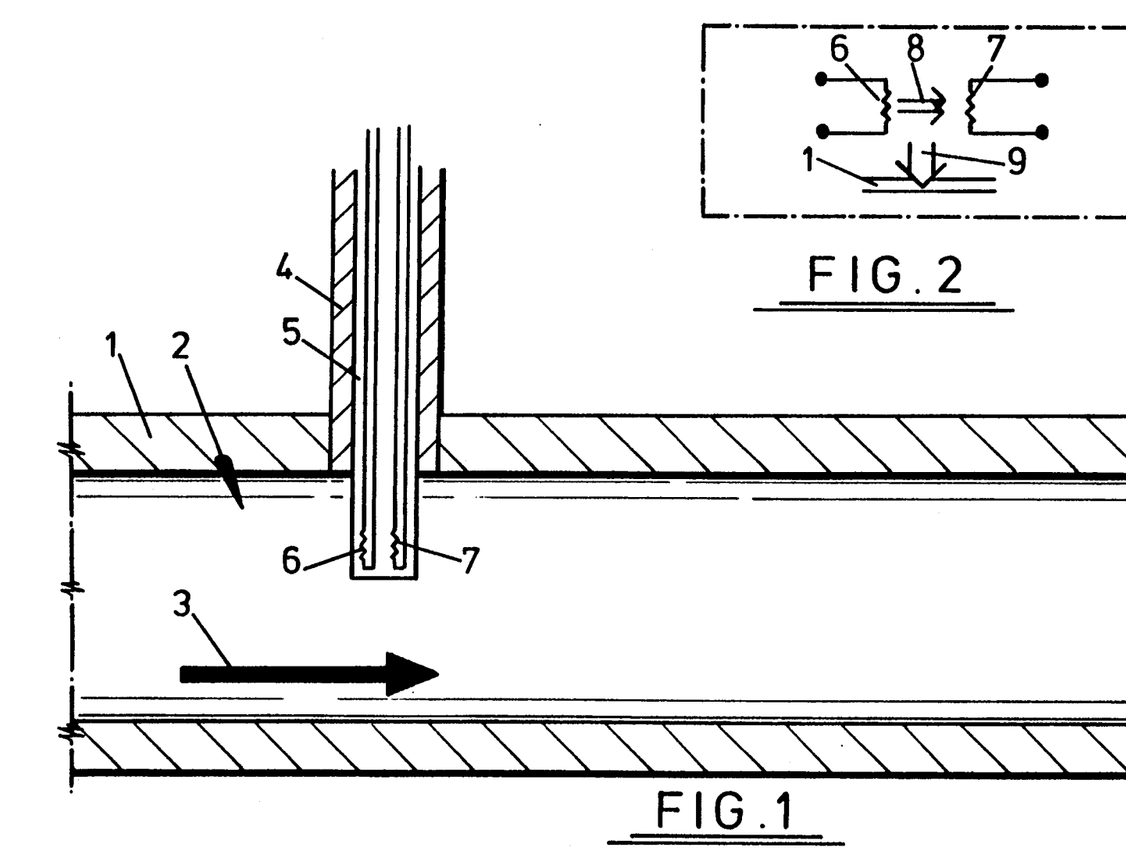
FIG. 1 is a schematic illustration of a conventional flow meter transducer.
FIG. 2 is a schematic electrical illustration of the component shown in FIG. 1.

Referring to FIG. 1, this illustrates the structure of a conventional transducer using a flow meter. A pipe 1 contains a process fluid 2 which is flowing in the direction of the arrow 3. In the illustrated example a flow meter transducer has a body which penetrates the pipe wall to project part way into the process fluid but this is not essential providing the transducer is in good thermal contact with the process fluid.

The transducer comprises an insulating sheath 4 within which an insulating body 5 supports a resistive heating element 6 and a resistive temperature sensor 7.

FIG. 2 schematically illustrates the basic operation of the transducer illustrated in FIG. 1. Energy is supplied to the heating element the temperature of which rises such that there is a transfer of energy from the heating element to the temperature sensor 7. That energy transfer is indicated by arrows 8. There is a further energy transfer however to the process fluid within the pipe and that energy transfer is indicated by arrow 9. The higher the flow rate, the greater is the energy transfer 9 and the lower is the energy transfer 8. The temperature sensed by the sensor 7 is a function of the magnitude of the energy transfer 8 and hence a function of the flow rate.

In one system in which the transducer described with reference to FIGS. 1 and 2 is used, the temperature sensed by the sensor 7 is maintained constant by controlling the power input to the heater 6. The power supplied to the heater is thus a function of the fluid flow and is used to provide an appropriate fluid flow output measurement. Unfortunately changes in the thermal properties of the process fluid or its temperature affect the relationship between power supplied and flow rate and thus this simple approach cannot be used if accurate flow rate measurements are required in circumstances in which changes in the characteristics and temperatures of the process fluid can be expected.

Figures 3, 4:
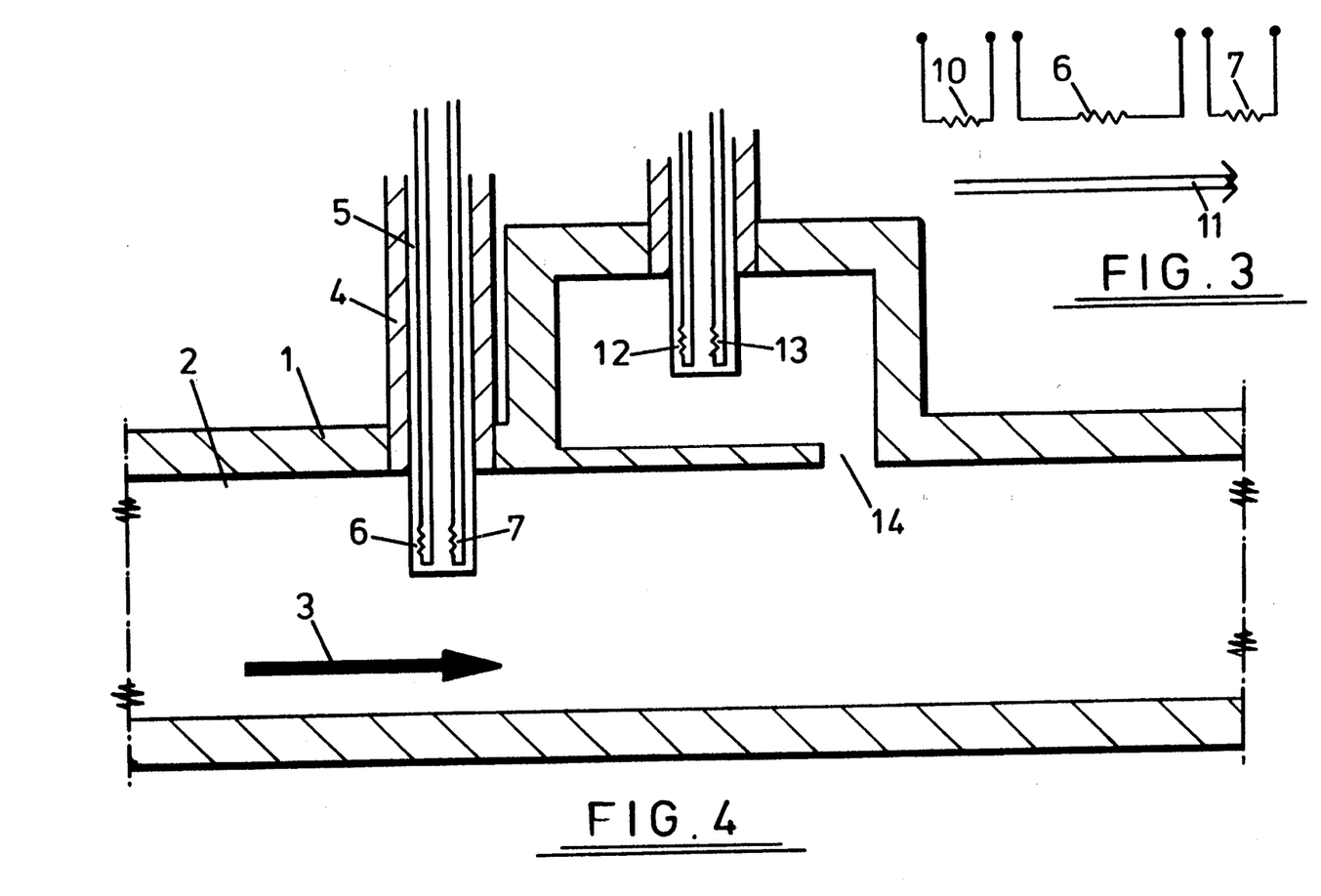
FIG. 3 is a schematic electrical diagram of a transducer array incorporating two temperature sensors.
FIG. 4 illustrates a double transducer array of a conventional flow meter.

It is known to overcome the problem of compensating for process fluid temperature changes by incorporating a further temperature sensor which senses the fluid temperature rather than the transducer temperature. FIG. 3 illustrates such a system, the transducer comprising a heater 6 and temperature sensor 7 being used in association with a further temperature sensor 10. The sensor 10 monitors the temperature of process fluid flowing in the direction of arrows 11 and this temperature measurement is used to adjust the temperature at which the sensor 7 is maintained by the power supplied by the heater 6 so that there is a constant temperature differential between the temperatures sensed by the sensors 10 and 7. This enables compensations to be made for variations in the process fluid temperature but is of no assistance in avoiding errors due to changes in thermal characteristics of the process fluid. Compensation for changes in the characteristics of the process fluid can be achieved if as an enhancement to the differential temperature technique described above a reference measurement is made which is representative of the thermal characteristics of the process fluid. An arrangement for making such a reference measurement is illustrated in FIG. 4. The same reference numerals are used in FIGS. 1 and 4 for identical components. In the arrangement of FIG. 4 however an auxiliary transducer is provided comprising a heater 12 and a temperature sensor 13. The auxiliary or reference transducer is located in a cavity 14 which is filled by the process fluid but through which the process fluid does not flow directly. Thus the fluid within the cavity 14 is either stationary or very slow moving and therefore the transducer incorporating heater 12 and sensor 13 is unaffected by the flow conditions to which the transducer incorporating heater 6 and sensor 7 is exposed.

Both of the transducers are operated so as to maintain a constant temperature differential between the temperature sensed by the sensors 7 and 13 and the temperature of the process fluid within the pipe 1. The process fluid temperature can be monitored by a further temperature sensor (not shown) or by occasionally switching one of the transducer heaters off for a predetermined period so that the associated temperature sensor assumes the fluid temperature. The levels of power supplied to the two transducers can be mathematically manipulated to remove the dependency of the measured outputs on thermal conductivity. As a first order correction if the temperature differential from the fluid temperature of the two transducers is the same then the power level values can be simply divided one into the other.

The techniques described with reference to FIG. 4 do allow for accurate compensation for thermal property changes and fluid and process fluid temperatures but cannot be used in all circumstances. For example at high flow rates it may not be possible to maintain the necessary temperature differential in the transducer exposed to the flow. Thus great care must be exercised to ensure that flow rate metering equipment is carefully matched to the particular application in which it is to be used.

Figure 5:
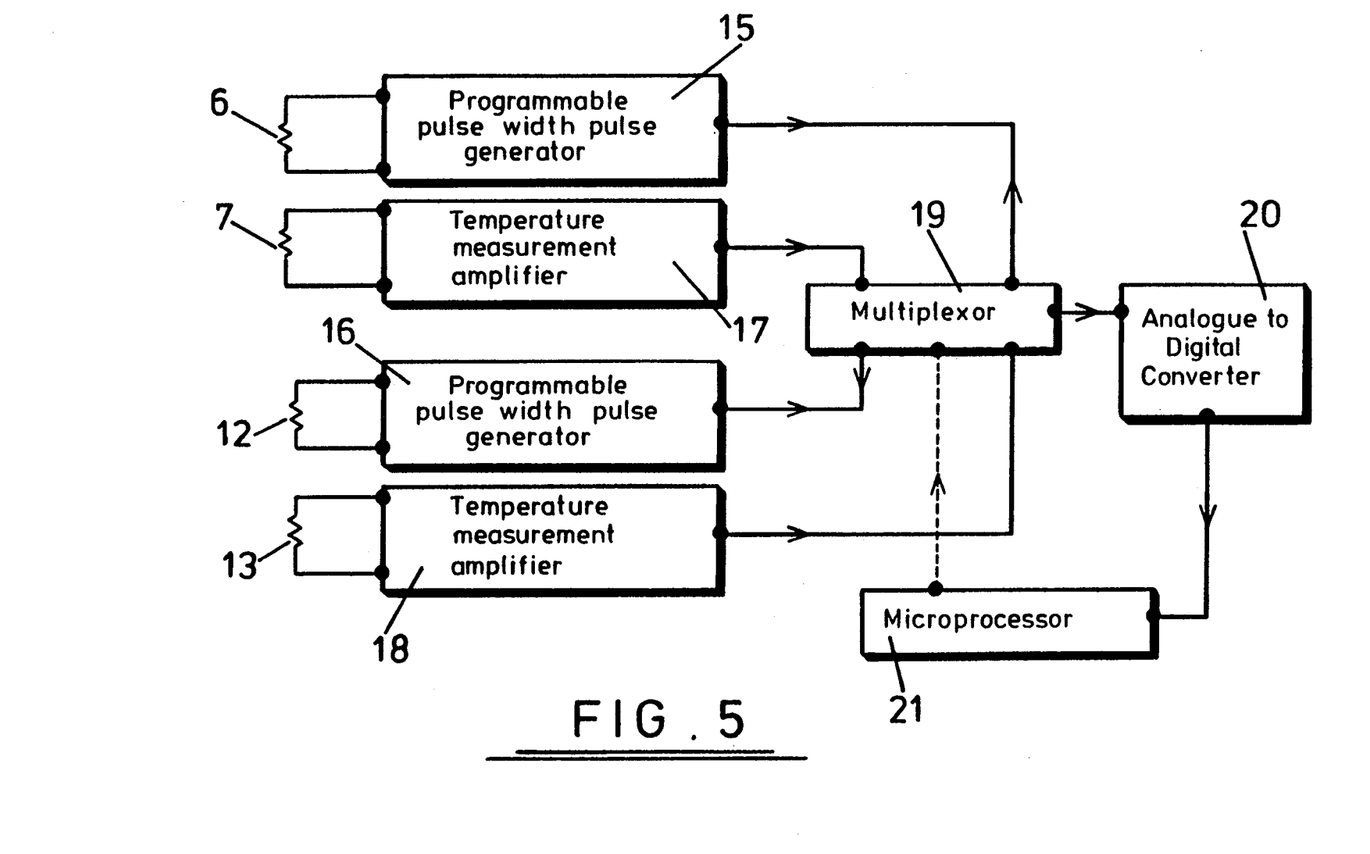
FIG. 5 illustrates the components of an embodiment of the present invention.

Referring now to FIG. 5, this schematically illustrates an arrangement in accordance with the present invention which is used in association with a transducer array of the type illustrated in FIG. 4. The heaters 6 and 12 are energised by respective programmable pulse width pulse generators 15 and 16 and the temperature sensors 7 and 13 provide outputs to respective temperature measurement amplifiers 17 and 18. A multiplexer 19 and an analogue to digital converter 20 provide inputs to a microprocessor 21 and a microprocessor provides control outputs via the multiplexer 19 to the pulse generators 15 and 16.

The microprocessor is programmed to switch between a range of operational modes as follows:

1. Constant power input—in this mode the power supplied to the heater 6 is maintained at a constant level. The temperature sensed by the sensor 7 is then inversely proportional to the flow rate.

This mode is used when large changes in flow rates or extremely high or low flow rates are encountered. The system switches into this mode of operation in the event of extreme or sudden change of flow rate taking its operation outside the predetermined limits of power settings in the constant differential temperature mode and on initial switch-on when the meter has no experience on which to base its settings.

2. Constant differential temperature—in this mode the reference transducer is used to monitor the process fluid temperature, that is to say the heater 12 is de-energised. This enables the system to quickly detect the flow rate changes. It is expected that in most applications the system will operate in this mode for most of the time.

3. Constant differential temperature—as for mode 2 above, but with the reference transducer operating as a fluid property measurement device in the manner described with reference to FIG. 4. In the event of any step changes in the process fluid temperature, and at preset time intervals in any event, the microprocessor can calculate the thermal properties of the process fluid and use the resultant measurements for compensation purposes. The microprocessor then stores the derived information to generate its own empirical compensation curve that is periodically up-dated during operation. When the sensor is operating in modes 1 or 2, this compensation curve may be used to minimise calibration errors.

The essence of the present invention is that the equipment varies its operating modes and parameters to match the prevailing process conditions. Various procedures for achieving this responsiveness are possible but an example is illustrated below.

Figure 6:
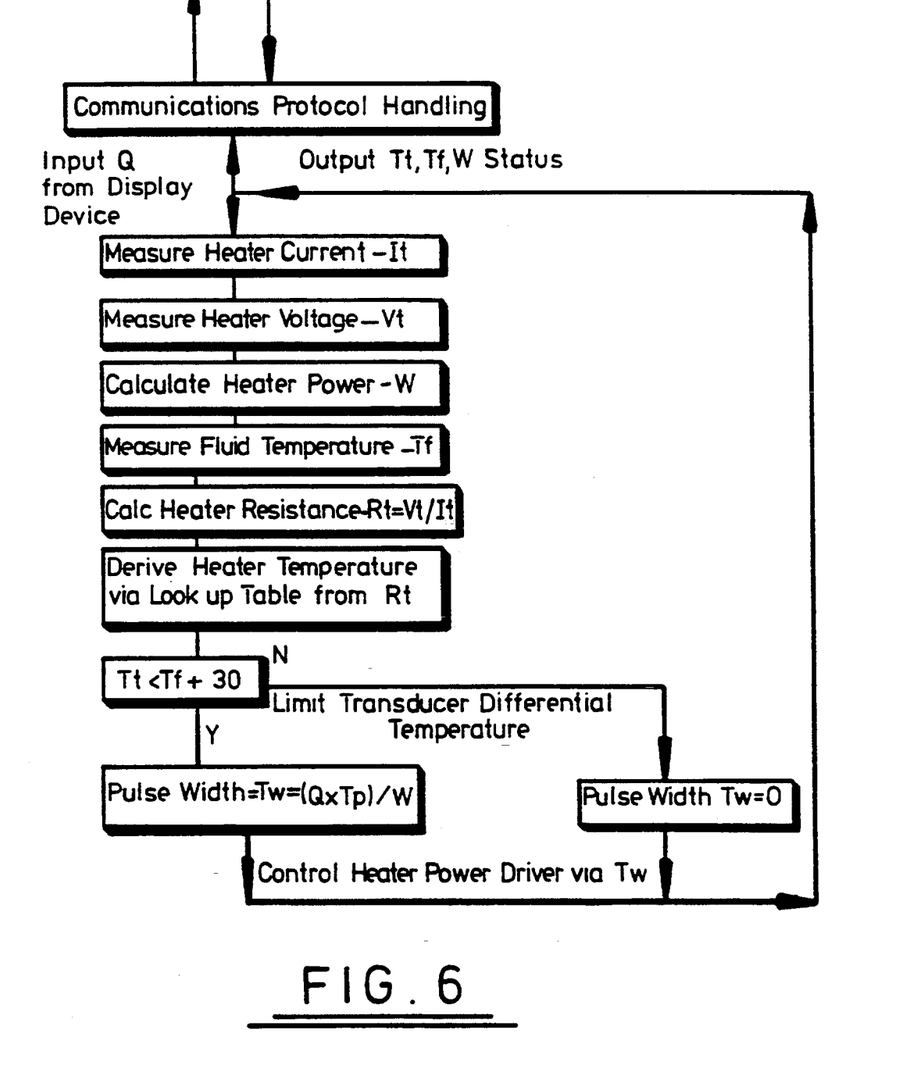
FIG. 6 is a flow chart of a control algorithm applied to sensors of the embodiment of FIG. 5.

As illustrated in FIG. 6, the maximum heater power W (assuming continuous connection to a voltage source) is calculated from the heater current It and voltage Vt when power is being supplied. The heater resistance Rt is calculated from It and Vt, and the heater temperature Tt is derived from a look up table of previously determined resistance/temperature values. The fluid temperature Tf is measured. If Tt is greater than the fluid temperature Tf by more than 30 degrees Celsius, it is assumed that no more power should be supplied to the heater. If Tt is less than 30 degrees Celsius above Tf, a pulse width Tw is calculated from:

$$Tw = Q.Tp/W$$

where Tp is the period of each pulse and Tw is the width of pulse required to provide the target power Q. Each pulse of width Tw causes power to be supplied to the heater for a corresponding period. The Value Tw at its maximum permissible value equates to Tp in that the pulse width extends for the full period Tp.

At any time during the meters' operation, the values Q, Tt and Tf enable the calculation of the mass flow rate of the fluid using an equation such as the one give above, together with a knowledge of the process fluid. However rather than have fixed values of heater power Q or transducer differential temperature Dt (Dt=Tt−Tf), the meter will "tune" itself from its own experience of the process conditions to maintain optimized values of Dt and Q.

Figure 7:
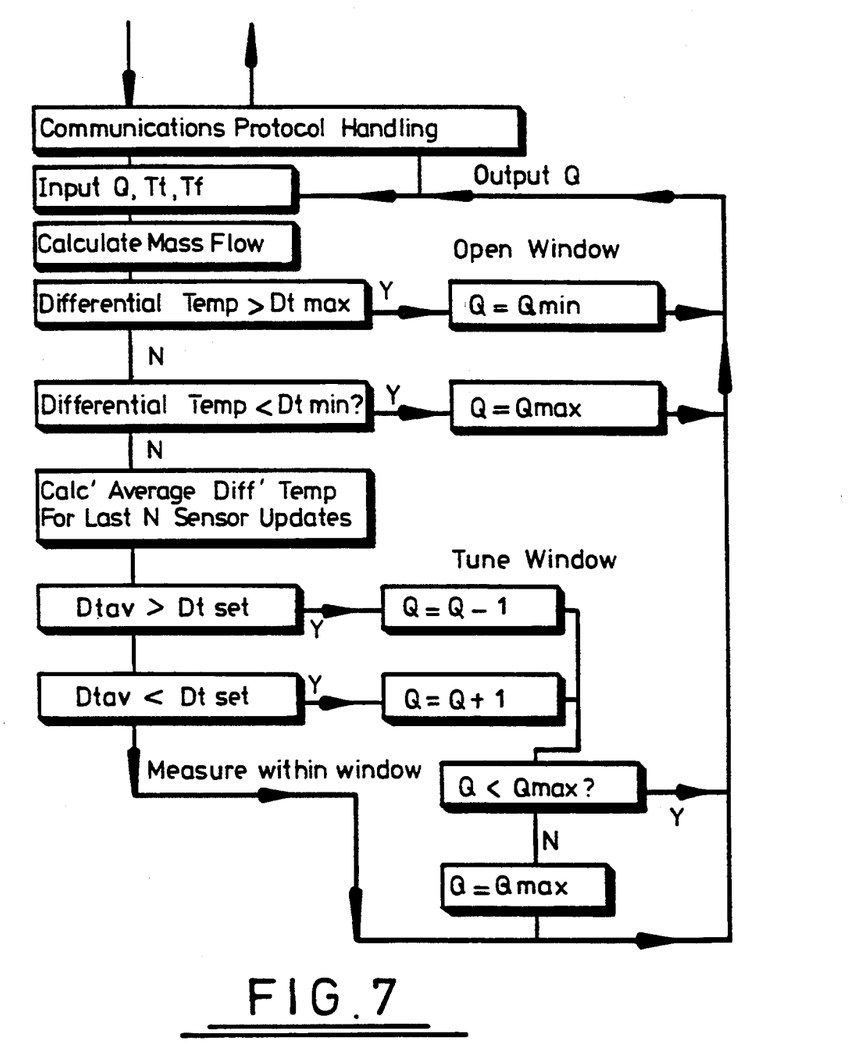
FIG. 7 is a flow chart of a control algorithm applied to a power supply controller of the embodiment of FIG. 5.

FIGS. 6 and 7 illustrate a simple embodiment of how control algorithms can be implemented in a microprocessor based design. The control algorithm is in two parts, FIG. 6 illustrating interaction with the sensor and FIG. 7 illustrating interaction with the transducer heater. They communicate via a common bus.

Referring to FIG. 6, the sensor algorithm is simply a constant power control loop. The power supply value Q received from the main instrument algorithm determines the target power setting of the transducer heater control loop. The actual values of the measured Q, the transducer temperature Tt and the fluid temperature are transmitted back to the instrument control algorithm.

The tuning is accomplished by the meter automatically adapting the transducer power in an attempt to obtain the maximum accuracy at any particular flow rate. This is does by slowly lowering or increasing the power setting to obtain a defined differential temperature that provides a "sensing window" that will track slow changes in flow rate, thus maintaining the same sized window (and hence accuracy) on either side of the actual flow rate. Sudden step changes can only be tracked by increasing or decreasing the transducer power in large steps. Thus, when the meter experiences large sudden changes of flow rate that take its operation outside the limits of the tuned condition and/or on initial power switch on the meter will switch to a default constant power setting. The initial value Q is chosen to allow the dynamic range of the meter to be large, thus allowing an initial "capture" of the flow rate, albeit with a relatively low response rate to small flow rate changes.

Referring to FIG. 7, this illustrates meter tuning. Inputs Tt and Tf enable calculation of Dt, and from Dt and Q the mass flow can be calculated from;

$$\dot{M} = A.(Q/Dt)^{1.66}$$

This equation is used to calculate the mass flow regardless of the operating mode of the meter. The user inputs Dtmax, Dtmin, and Dtset. Dtmax and Dtmin are the maximum and minimum differential temperatures respectively which are to be accepted. Dtset is the differential temperature considered by the user to be the most appropriate to the flow conditions that are expected.

At startup, Dt=0, and the heater is immediately switched to maximum power Qmax as Dt is less than Dtmin. Dt is then sampled periodically and the average of the last N samples is retained as the average differential temperature Dtav. Dt will increase rapidly given that power is being supplied at the maximum rate. As soon as Dtay is greater than Dtset, power will be reduced by one small step represented as "Q−1". The system cyclically tests Dtay against Dtset and the power supply is switched in a series of small steps until it stabilizes with Dt close to Dtset. Assuming no major fluctuations in flow conditions, Q is adjusted to maintain this condition.

In the event of a sudden change in flow conditions, e.g. a rapid rise of Dt due to a sharp reduction in flow, Dtav is greater than Dtset and therefore Q is stepped down, but at a relatively slow rate. If nothing further was done it could take a considerable period for Dt to be stabilized at Dtset, and in extreme cases that condition might never be achieved. To overcome this, if Dt exceeds Dtmax, the power is immediately cut back to Qmin.

Thus wherever possible the meter operates in constant differential temperature mode, and is rapidly stabilized in that mode of operation by temporarily switching to the constant power mode. If conditions are such that constant differential temperature mode is not achievable, the meter automatically assumes constant power mode. This is an efficient way to achieve good sensitivity and economy in a variety of conditions.

The user has to predetermine Dtmax, Dtmin and Dtset. Dtmax and Dtmin are not generally critical and may be predetermined relatively easily, for example by the equipment supplier. Dtset is generally more critical as it is ideally matched to the expected flow conditions, which vary from application to application and from time to time in a single application. To achieve this matching, Dtset could be determined by reference to operational experience. For example, if Dtset is too high, the system might regularly switch to Qmin constant power mode and only rarely to Qmax constant power mode. Thus Dtset could be reduced as a function of the proportion of the operating time for which the rate of power supply is at level Qmin, and vice versa. As a further possibility, the size of the step changes in Q when operating in constant differential temperature mode could be increased if the system switches to constant power mode very frequently.

By providing the various capabilities outlined above, a single piece of equipment can be used in circumstances where very different rates of flow may be encountered. In addition, the best features of the various prior art alternative modes of operation can be selected to achieve optimum accuracy.

Figure 8:
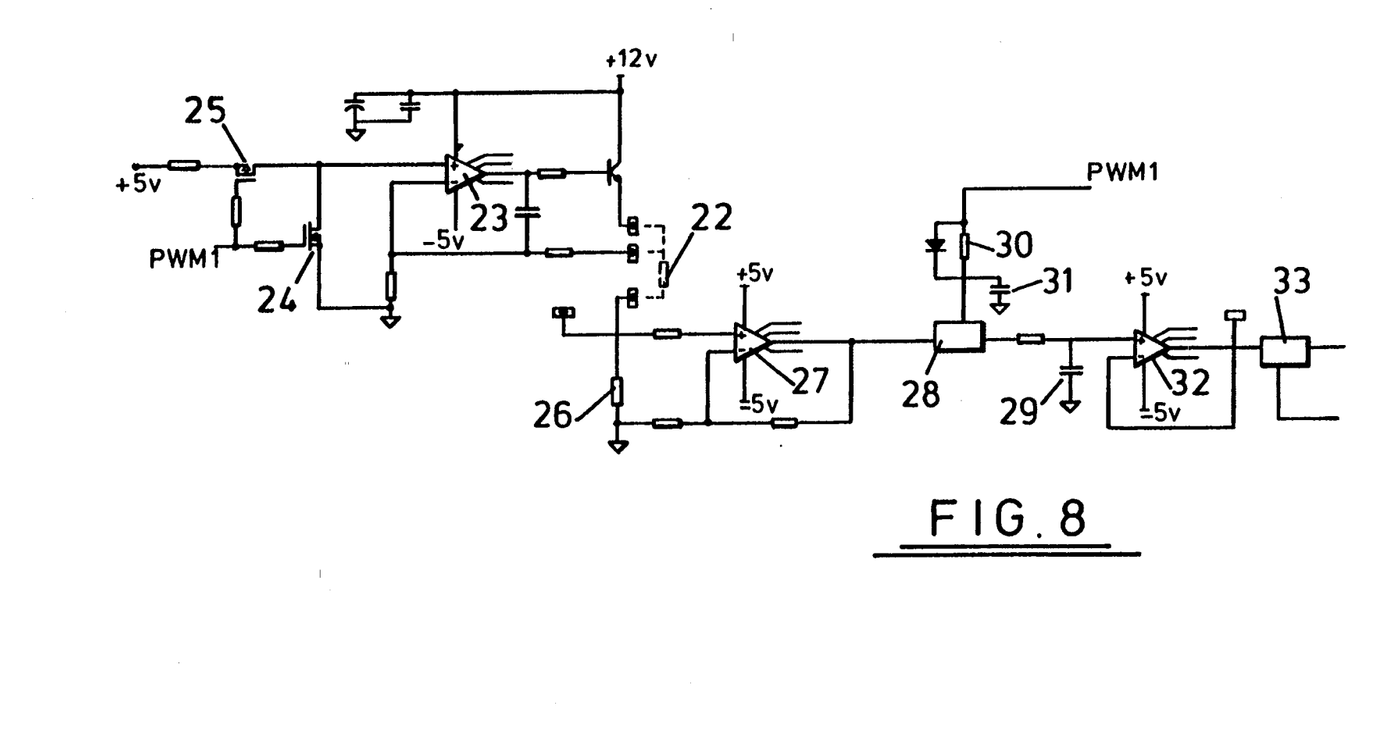
FIG. 8 illustrates circuitry of a heater driver of the embodiment of FIG. 5 showing how power supply Q is derived to permit calculation of pulse width Tw in FIG. 6.

Referring to FIG. 8, this illustrates a heater driver suitable for use in the embodiment of FIG. 5. The same type PT100 element 22 is used as both the transducer heater and the temperature sensing element. For the purpose of simplicity, the text treats the heater and the temperature detector as two devices.

The power is controlled by a PWM signal from the microprocessor which varies the duty cycle over a fixed 2.2 mS period. This PWM signal is used to gate an accurate voltage reference to the positive input of amplifier 23 via transistor 24 and transistor 25, which amplifies this switch reference signal to give either 0 v or 10 v across the heater RTD and sense resistor. The voltage across the sense resistor 26 is amplified by amplifier 27 and put through a sample and hold circuit formed by circuit 28 and capacitor 29 which samples the current only whilst the heater driver is switched on. The sampling control comes from the PWM signal (PWM 1) slightly delayed by resistor 30 and capacitor 31 to allow settling time for the amplifiers. The sampled signal is then buffered by amplifier 32 and gated to the A/D input via circuit 33 when required. By knowing the duty cycle and measuring the magnitude of the "ON" current, the microprocessor can calculate the average voltage and current over each 2.2 mS period. From these values, the microprocessor can then calculate the average transducer power and resistance. From a knowledge of the well defined PT100 temperature/resistance characteristic, the temperature of the heater can then be derived.

With regard to the circuit components shown in FIG. 8, components 23, 27 and 32 can be standard ICL7650 circuits. Components 28 and 33 can be standard MAX334 components.

Figure 9:
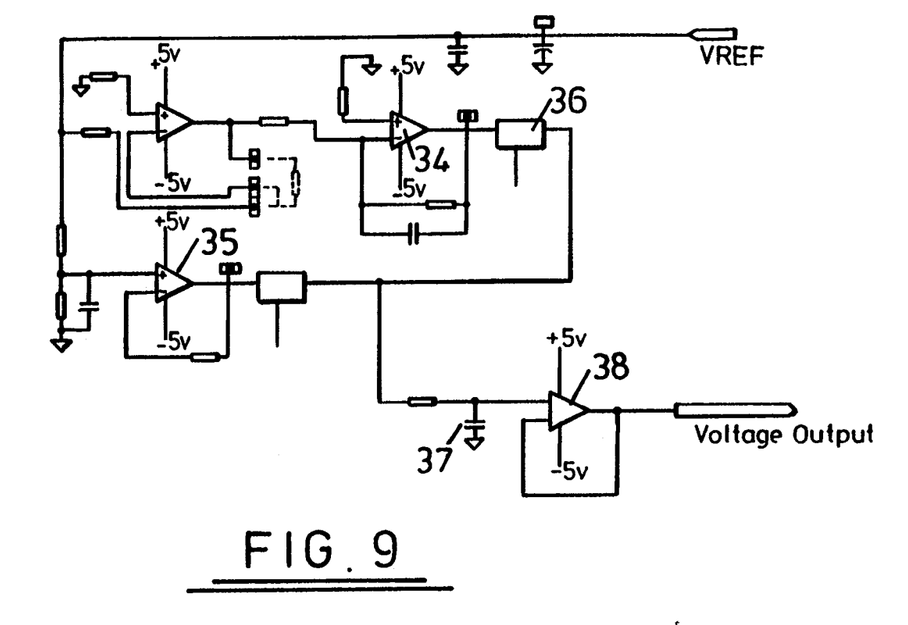
FIG. 9 illustrates circuitry of a fluid temperature sensor of the embodiment of FIG. 5.

Turning now to FIG. 9, this illustrated the fluid temperature sensing circuitry. The resistance of the fluid temperature RTD is measured by passing a constant current through the RTD and then measuring the voltage developed across it. This voltage is then amplified by amplifier 34 so that the maximum process temperature expected corresponds to the measuring limits of the A/D circuit. The same reference is used for the constant current drive and the A/D so that the input is a ratiometric input immune to any changes in the voltage reference.

A fraction of the voltage reference (VREF) is buffered by circuit 35 then used as one of the multiplexed signals to the A/D converter. This is read in the same manner as all the other inputs but is only used for calibration purposes.

The microprocessor controls which input is routed to the A/D circuit via one of four semiconductor switches 36. Each input is selected in cyclic order. The last input voltage is stored on capacitor 37 when all the switches are off. This "held" voltage is buffered by a high input impedance amplifier 38 whilst the input value is being measured. This prevents an incorrect value due to it changing during the measurement period of the A/D. Again standard components can be used, for example ICL7650 amplifiers, MAX430 amplifiers and MAX334 switches.

The circuits described in FIGS. 8 and 9 are linked to a microprocessor having 256 Kbytes of program memory, 8 Kbytes of RAM, a programmable counter, non-volatile memory, and a customised gate array. The programmable counter is used to generate two PWM signals that can be controlled with 12 bit accuracy, (0.025%). It can also change the period of the PWM signal if required simply by changing the settings of an internal clock. These PWM signals are used to drive the heated RTD.

The non-volatile memory is used to store several constants that relate to the calibration of the sensor since the calibration routine is automated with no potentiometers to adjust. The data is stored in a serial manner and all data is saved with a checksum for that parameter as well as an overall checksum.

The gate array contains circuitry for a "watchdog circuit" which must be strobed on a regular basis else it resets the microprocessor and a power up/down detection circuit that warns of impending power loss or prevents the digital circuit from functioning with too low a power supply. It also contains the hardware interface for the digital data transmission between the sensor and for example control room instrumentation.

We claim:
1. A flow meter comprising:
   a body located in thermal contact with a fluid the flow rate of which is to be measured;
   a heater in thermal contact with the body;
   a first temperature sensor for measuring the temperature of the body;
   a second temperature sensor for measuring the temperature of the fluid;
   means for calculating the differential temperature between the fluid and the body;
   means for supplying power to the heater;
   means for measuring the rate at which power is supplied to the heater;
   means for setting a predetermined target differential temperature, and predetermined maximum and minimum differential temperatures;
   means for comparing the calculated differential temperature with the predetermined target, maximum and minimum differential temperatures;
   means for controlling the rate that power is supplied to the heater to increase the rate of supply at one predetermined rate if the calculated differential temperature is between the target differential temperature and the minimum differential temperatures and at a higher predetermined rate if the calculated differential temperature is less than the minimum differential temperature, the controlling means also controlling the rate that power is supplied to the heater to decrease the rate of supply to a predetermined minimum rate of power if the calculated differential temperature is greater than the maximum differential temperature; and
   means for calculating the flow rate from the measured rate of power supply and the difference between the temperatures of the body and the fluid.

2. A flow meter according to claim 1, wherein the power supplying means increases the rate of power supply in a single step to the predetermined maximum rate if the calculated differential temperature is less than the target differential temperature.

3. A flow meter according to claim 1, wherein the power supplying means decreases the rate of power supply in a single step to a predetermined minimum rate if the calculated differential temperature is greater than the target differential temperature.

4. A flow meter according to claim 1, wherein the calculating means calculates the differential temperature by averaging the differences between a plurality of measurements of the fluid and body temperatures taken at regular intervals.

5. A flow meter according to claim 4, wherein the controlling means adjusts the rate that power is supplied to the heater at each said interval.

6. A flow meter according to claim 1, comprising means for monitoring the proportion of operating time of which the rate of power supply is at said predetermined maximum rate or said predetermined target differential temperature as a function of the proportion of the operating time for which the rate of power supply is at the said predetermined minimum rate, and means for increasing the said predetermined target differential temperature as a function of the proportion of the operating time for which the rate of power supply is at the predetermined maximum rate.

7. A flow meter according to claim 1, comprising means for monitoring the frequency with which the rate of power supply is at said predetermined maximum rate of power supply, and means for increasing the said one predetermined rate at which the said rate of supply of power is increased as a function of the monitored frequency.

8. A flow meter comprising:
   a body located in thermal contact with a fluid the flow rate of which is to be measured;
   a heater in thermal contact with the body;
   a first temperature sensor for measuring the temperature of the body;
   a second temperature sensor for measuring the temperature of the fluid;
   means for calculating the differential temperature between the fluid and the body;
   means for supplying power to the heater;
   means for setting a target differential temperature, a maximum differential temperature, and a minimum differential temperature;
   means for comparing the calculated differential temperature with the target, maximum and minimum differential temperatures;
   means for controlling the rate at which power is supplied to the heater, the controlling means increasing the rate of power supply to the heater up to a predetermined maximum power supply level at a first rate if the calculated differential temperature is between the target differential temperature and the minimum differential temperature and the controlling means increasing the rate of power supply to the heater up to a maximum power supply level at a second rate if the calculated differential temperature is less than the minimum differential temperature, the second rate being larger than the first rate, the controlling means for reducing the rate of power supplied to the heater to a predetermined minimum at a first rate if the calculated differential temperature is greater than the maximum differential temperature; and
   means for calculating the flow rate from the measured rate of power supply and the difference between the temperatures of the body and the fluid.

9. A flow meter according to claim 8, wherein the power supplying means increases the rate that power is supplied to the heater in a single step to the predetermined maximum rate if the calculated differential temperature is less than the predetermined minimum differential temperature.

10. A flow meter according to claim 8, wherein the power supplying means decreases the rate that power is supplied to the heater in a single step to a predetermined minimum rate if the calculated differential temperature is greater than the predetermined maximum differential temperature.

11. A flow meter according to claim 8, wherein the calculating means calculates the differential temperature by averaging the differences between a plurality of measurements of the fluid and body temperatures taken at selected intervals.

12. A flow meter according to claim 11, wherein the controlling means adjusts the rate that power is supplied to the power supply at each said interval.

13. A flow meter according to claim 8, comprising means for monitoring the proportion of operating time during which power is supplied to the heater at said predetermined maximum rate and means for increasing the said target differential temperature in proportion of operating time during which power is supplied to the heater at the predetermined maximum rate.

14. A flow meter according to claim 8, comprising means for monitoring the proportion of operating time during which power is supplied to the heater at said predetermined minimum rate and means for decreasing the said target differential temperature in proportion of operating time during which power is supplied to the heater at the predetermined minimum rate.

15. A flow meter according to claim 8, comprising means for monitoring the frequency with which the rate of power supply is at said predetermined maximum rate of power supply, and means for increasing the first rate at which the said rate of supply of power is increased as a function of the monitored frequency.

* * * * *